United States Patent [19]

Weiner

[11] 4,419,410

[45] Dec. 6, 1983

[54] HIGHLY STEREOREGULAR FILMS OF IMPROVED SURFACE CHARACTERISTICS AND METHOD OF FORMING SAME

[75] Inventor: Milton L. Weiner, Rochester, N.Y.

[73] Assignee: Mobil Oil Corporation, New York, N.Y.

[21] Appl. No.: 400,830

[22] Filed: Jul. 22, 1982

[51] Int. Cl.³ .............................................. B32B 27/08
[52] U.S. Cl. ............................... 428/516; 156/244.11; 156/244.24; 428/349; 428/910
[58] Field of Search .................. 428/516, 349, 347; 156/244.11, 244.24

[56] References Cited

U.S. PATENT DOCUMENTS

| | | | |
|---|---|---|---|
| 3,176,021 | 3/1965 | Volungis et al. | 525/240 |
| 3,399,156 | 8/1968 | Bell | 524/583 |
| 3,519,531 | 7/1970 | James et al. | 428/349 |
| 4,117,193 | 9/1978 | Tsuchiya et al. | 428/516 |
| 4,252,851 | 2/1981 | Lansbury et al. | 428/347 |
| 4,259,412 | 3/1981 | Buzio et al. | 428/910 |
| 4,348,457 | 9/1982 | Rosenthal et al. | 428/349 |

*Primary Examiner*—George F. Lesmes
*Assistant Examiner*—E. Rollins Buffalow
*Attorney, Agent, or Firm*—A. J. McKillop; M. G. Gilman; J. F. Powers

[57] ABSTRACT

A process for enhancing the degree of bloom of a polymer film structure containing a surface-modifying agent and the film structure resulting therefrom.

25 Claims, No Drawings

HIGHLY STEREOREGULAR FILMS OF IMPROVED SURFACE CHARACTERISTICS AND METHOD OF FORMING SAME

BACKGROUND OF THE INVENTION

The invention relates to multi-layer highly crystalline polymer films having improved surface characteristics. The invention also relates to a method of improving the surface characteristics of highly crystalline thermoplastic resin films.

Polymeric films, useful for applications such as packages and other forms of wrapping, inherently possess certain characteristics which hinder the easy handling of the film during its use. In order to overcome these characteristics the film surface has to be modified by the provision thereon of materials calculated to improve the film handling. For example, slip agents, anti-blocking agents, anti-static agents, etc. are provided on the surface to overcome the inherent, undesirable characteristics of the resin in film form. It is common practice with films such as polypropylene to incorporate into the resin material certain slip agents so that during formation of the polypropylene film the slip agent will come to the surface or bloom and thus be available to form a low coefficient of friction surface thereby improving the handling of the film. Unfortunately, it has been discovered that for certain polymer films the amount of additive released to the surface by exudation or blooming is not always in an effective amount.

Oriented highly stereoregular polypropylene film has become a useful and widely accepted packaging film because of its good moisture barrier, stiffness, high strength, and good optical properties. This material, however, is an example of an excellent film which exhibits poor handling characteristics. It appears that as the degree of stereo-regularity increases the quantity of surface modifying additive exuded to the surface decreases.

Its an object of the present invention to provide a multi-layer film structure having an effective amount of surface modifying material on at least one surface thereof.

Another object of the instant invention is to present a process for improving the surface characteristics of a polymer film of comparatively high stereo regularity.

SUMMARY OF THE INVENTION

It has been found that to a certain extent high crystallinity impedes facile migration of additives to the surface of such a polymer in film form. In addition it has been found that in the case of these highly stereoregular resins, transport of an additive onto the film surface is significantly impeded by the surface itself. It has been discovered that if this surface is in effect buried by coextrusion with a thin polymer layer of less stereoregularity than the base layer, the new surface does not present as great an impediment to additive migration or surface bloom.

The present invention is, therefore, broadly directed to a process for enhancing the exudation of a surface-modifying agent to the surface of a polymer film structure comprising melt coextruding a combination of:
(a) a base layer comprising a polymer of comparatively high stereoregularity, the precursor resin of which contains said surface-modifying agent at least substantially uniformly dispersed therein; and
(b) a skin layer comprising a polymer of comparatively low stereoregularity on at least one surface of (a); and orienting the structure, whereby said surface-modifying agent of (a) exudes or blooms to the surface of (b) to a greater extent than in the absence of (b).

The present invention is also directed to a multi-layer polypropylene film structure having a surface-modifying agent bloomed on the surface thereof comprising an oriented coextruded combination of:
(a) a base layer comprising polypropylene of comparatively high stereoregularity, the precursor resin of which contains said surface-modifying agent at least substantially uniformly dispersed therein; and
(b) a skin layer comprising polypropylene of comparatively low stereoregularity on at least one surface of (a); the surface of (b) having bloomed thereon said surface-modifying agent in an effective quantity greater than that of said surface-modifying agent-containing precursor resin above in extruded film form.

DETAILED DESCRIPTION OF THE INVENTION

The invention is broadly directed to the improvement of the surface characteristics of any highly crystalline or highly stereoregular polymer in oriented film form. Of particular interest are the polyolefins and polyvinyl chloride. Of the polyolefins particularly preferred are the polypropylenes which are highly isotatic.

The preferred polypropylenes of the present invention are well known in the art and are formed by polymerizing propylene in the presence of stereospecific catalyst systems. They can have a melt index at 230° C. ranging from about 0.1–25.0. The crystalline melting point is about 160° C. The number average molecular weight ranges from about 25,000–100,000. The density ranges from 0.90–0.91.

The comparatively low stereoregular polymers experience no significant difficulty in exuding or blooming additives to their surface when extruded in film form. These films however, do not have the excellent physical characteristics inherent in the polypropylenes of comparatively high stereoregularity. Thus, the tradeoff of the excellent characteristics of good moisture barrier, stiffness, high strength, good optical properties, etc. would be undesirable merely to gain improved surface characteristics. Therefore, the present invention has as its primary object the provision of a highly stereo specific polymer, such as polypropylene, but with excellent surface characteristics. The overall thickness of the contemplated film structure must be primarily of the highly stereoregular polypropylene. The highly isotatic polypropylene portion of the film should amount to from about 70 to about 97% of the overall film structure. The coextruded layer of comparatively low stereoregularity may be present on one or both surfaces of the layer of comparatively high stereoregularity. It is preferred that if the skin is on both sides of the base film that the thickness of each skin can range from about 1.5% to about 15% of the base film. If a single skin layer is on the surface of the base film the preferred range is from about 1.5 to 30% of the overall thickness. The overall thickness of the multi-layer film structure is not critical but preferably can range from about 0.35 to 2.0 mils.

As indicated above, it is usual to include in the resin raw material the additive desired to modify the surface characteristics of the resin in film form. Normally this is incorporated in the resin by the resin supplier. By way of example, slip additives such as erucamide, oleamide, stearamide, etc. can be included in the resin in from 300 to 3500 p.p.m.

In the practice of the present invention it is to be understood that the comparatively low stereoregular polymer coextruded with the comparatively high stereoregular polymer may or may not contain the desired additive dispersed in its resin precursor. Because of the present discovery, sufficient additive will be exuded from the base film to the surface of the comparatively low stereoregular film and, thus, additive in the outer film resin starting material is not necessary but may be desired. In addition, the comparatively low stereoregular outer film could not be the sole supply of the surface additive since its thickness would be insufficient to supply an adequate quantity of surface modifying additive and still cope with base film equilibration loss. Furthermore, optical characteristics would suffer if the low stereoregular film were the sole source of the slip agent. Thus, the base film must at least be the principal source of the surface modifying additive.

The multi-layer film of the present invention can be prepared employing commercially available systems for coextruding resins. The polypropylene homopolymer of comparatively high stereoregularity, containing from 300 to 20,000 parts per million, depending on additive type, can be coextruded with a polypropylene homopolymer or copolymer of comparatively low stereoregularity containing no additive dispersed therein. The polymers are brought to the molten state and coextruded from a conventional extruder through a flat sheet die, the melt streams being combined in an adapter prior to being extruded from the die. Each skin layer can comprise, for example, approximately 7.5% of the total thickness of the film. After leaving the die orifice, the multi-layer film structure is chilled and the quenched sheet then reheated and stretched, e.g. five times in the machine direction (MD) and subsequently about e.g., eight times in the transverse direction (TD). The edges of the film can be trimmed and the film wound on cores. It is preferred that the thus formed structure be conditioned or equilibrated by holding the same for a period of about 6 hours to one week at a temperature of from about 85°–150° F., especially preferred is from about 6 hours to 72 hours at between 100°–140° F. This film will be shown to have more additive on the surface thereof, available to modify the characteristics of the surface, than would be true if the comparatively low stereoregular polymer film were not present.

With the application of a single layer of comparatively low stereoregular polypropylene on one surface of the high stereoregular polypropylene layer, the uncoated surface will have less additive, e.g. slip agent, anti-static, mold release, etc. This might be particularly advantageous in certain instances where an asymmetry of amount of bloomed additive on the surfaces is desired.

Several methods exist for the characterization of resins in terms of their relative stereoregular character. One method, found to be especially useful, consists of determining the temperature at which the complex modulus reaches an arbitrarily selected reference level when the film is heated. The apparatus used for this test is a Rheovibron Model DDV-II, manufactured by the Toyo Measuring Instruments Company of Japan. The conventional oven supplied by the manufacturer of this instrument was replaced by an oven heated with a forced air stream and is therefore capable of rapidly reestablishing temperature after the oven has been opened to introduce a test sample.

The details of the test procedure are:

(1) a 27 mil plaque of the resin to be tested is prepared by compression molding at 400° F., followed by quenching in a 50° C. water bath. Individual rectangular test strips are cut from this plaque measuring 4.6 cm $\times$ 0.4 cm $\times$ 27 mils.

(2) The oven is preheated to the approximate desired temperature and the sample is rapidly inserted and mounted in the sample grips of the Rheovibron device. The oven is closed and after exactly 90 seconds, the complex modulus is determined at 110 cycles per second. At the same time the air temperature immediately adjacent to the test sample is determined by a thermocouple.

(3) Complex modulus data so collected are determined at three temperatures covering approximately a 10° F. range. Three replicates are tested at each temperature. The temperature range is selected to include that temperature at which the value of the complex modulus would be $1.40 \times 10^8$ dynes per square centimeter.

(4) The data are plotted and the temperature at which the value of the complex modulus is $1.40 \times 10^8$ dynes is determined. This temperature is termed $T_R$. The higher the value of $T_R$, the more stereoregular or crystallizable in character is the resin within a given family of resins (polypropylene).

The following Table tabulates the materials employed in the following specific examples and under the heading $T_R$ gives the temperature or temperature range value which is indicative of the degree of stereoregularity of the material.

TABLE I

| Polymeric Material | $T_R$ |
|---|---|
| Tenite 612 | 298–300° F. |
| Hercules 6531 | 306.9° F. |
| Shell LF6405 | 311.5° F. |
| ARCO 8670E | 309–311° F. |
| ARCO W472 | 309–311° F. |
| ARCO 9670 | 265° F. |

EXAMPLE 1

A polypropylene homopolymer of high stereoregularity, i.e., ARCO W472, containing 1500 ppm of erucamide slip agent, said polymer obtained from ARCO Polymers, Inc., Philadelphia, Pa., was melt coextruded with a polypropylene homopolymer of lower stereoregularity, i.e., Tenite 612, containing no slip agent, said polymer obtained from Eastman Chemical Products, Longview, Tex. The total film gauge was 0.8 mil with the Tenite 612 skin layers each amounting to about 7½% of the overall gauge. The molten polymers were coextruded from a conventional extruder through a flat sheet die, the melt streams being combined in an adaptor prior to being extruded.

After leaving the die orifice, the film was quenched and then reheated to orientation temperature of about 290° F. and oriented 5 times MD and 9 times TD. The edges were trimmed and the film wound on a hollow mandrel.

EXAMPLE 2

Using the same general procedure, the ARCO W472 polypropylene of Example 1 was extruded without a skin layer.

EXAMPLE 3

Using the same general procedure a comparatively highly stereoregular polypropylene core layer, Shell LF6405, containing 3000 ppm erucamide slip agent was melt coextruded with the Tenite 612 of Example 1.

EXAMPLE 4

Using the procedure of Example 2 the Shell LF6405 polypropylene was extruded without a skin layer.

EXAMPLE 5

Another film was prepared using the above-described coextrusion technique employing Shell LF6405 containing 3000 ppm erucamide slip agent as the precursor resin of the core layer coextruded with Hercules 6531 polypropylene, containing no slip agent.

EXAMPLE 6

This film was prepared from ARCO 8670E polypropylene homopolymer, containing 3000 ppm erucamide slip agent, coextruded with ARCO 9670, an ethylene-propylene copolymer containing about 3% by weight ethylene. The copolymer had no slip agent therein.

EXAMPLE 7

This film was prepared from the polypropylene homopolymer of Example 6 with no skin layers.

In order to test the effectiveness of the present invention, the films of the examples were equilibrated for 24 hours at 125° F. and then the coefficient of friction of film surface to film surface was determined according to ASTM method 1894-78. The following Table details the results.

TABLE II

| EXAMPLE | CORE LAYER | SLIP AGENT | SKIN LAYERS | GAUGE | COEFFICIENT OF FRICTION |
|---|---|---|---|---|---|
| 1 | ARCO W472 | 1500 ppm | TENITE 612 | 0.8 mil | 0.18 |
| 2 | ARCO W472 | 1500 ppm | None | 0.8 mil | 0.39 |
| 3 | SHELL LF6405 | 3000 ppm | TENITE 612 | 0.8 mil | 0.14 |
| 4 | SHELL LF6405 | 3000 ppm | None | 0.8 mil | 0.34 |
| 5 | SHELL LF6405 | 3000 ppm | HERCULES 6531 | 0.8 mil | 0.24 |
| 6 | ARCO 8670E | 3000 ppm | ARCO 9670 | 1 mil | 0.09 |
| 7 | ARCO 8670E | 3000 ppm | NONE | 1 mil | 0.25 |

The coefficient of friction data shows that in each instance of coextrusion with skin layers of a resin of lower stereoregularity, a greater quantity of slip agent bloomed through the skin layer which contained no slip agent than migrated to the surface of films containing no skin layers.

In the same manner, any additive or combination of additives present in a precursor resin, which is intended to migrate or bloom to the surface to modify the same will do so with greater facility if a thin layer of a less crystalline polymer is coextruded with the additive containing base layer. Additives such as the antistatic compositions, Armostat 310 and 410 and glyceryl monostearate; antifog agents, including the Tweens, etc.

As used herein the term "bloom" is intended to describe the condition which results when an additive uniformly distributed throughout a polymer migrates at least to some extent to the surface of a film of the polymer.

What is claimed is:

1. A process for enhancing the exudation or bloom of a surface-modifying agent selected from the group consisting of a slip agent, antistatic agent, antifog agent, antiblock agent and any mixtures thereof to the surface of a polymer film structure comprising melt coextruding a combination of:
   (a) a base layer comprising polypropylene of comparatively high stereoregularity, the precursor resin of which contains said surface-modifying agent at least substantially uniformly dispersed therein; and
   (b) a skin layer comprising polypropylene of comparatively low stereoregularity on at least one surface of (a); and orienting the structure, whereby said surface-modifying agent of (a) exudes or blooms to the surface of (b) to a greater extent than in the absence of (b).

2. The process of claim 1 wherein said structure is biaxially oriented.

3. The process of claim 2 wherein the skin layer thickness is a minor percentage of the overall film thickness.

4. The process of claim 3 wherein said minor percentage is from about 1.5 to 30% of the overall thickness.

5. The process of claim 1 wherein said agent is a slip agent.

6. The process of claim 5 wherein said slip agent is an amide of a fatty acid.

7. The process of claim 6 wherein said amide is selected from the group consisting of erucamide, oleamide, stearamide and mixtures thereof.

8. The process of claim 2 wherein the film structure is conditioned by holding the same for a period of about 6 hours to about one week at a temperature of from about 85° to about 150° F.

9. The process of claim 8 wherein said structure is held for a period of about 6 hours to about 72 hours at a temperature of from about 100° to about 140° F.

10. An oriented multi-layer polypropylene film structure having a surface-modifying agent selected from the group consisting of a slip agent, antistatic agent, antifog agent, antiblock agent, and any mixtures thereof bloomed on the surface thereof comprising a coextruded combination of:
   (a) a base layer comprising polypropylene of comparatively high stereoregularity, the precursor resin of which contains said surface-modifying agent at least substantially uniformly dispersed therein; and
   (b) a skin layer comprising polypropylene of comparatively low stereoregularity on at least one surface of (a);
   said combination having been oriented;
   the surface of (b) having bloomed thereon said surface-modifying agent in an effective quantity greater than that of said surface-modifying agent-containing precursor resin alone in extruded film form.

11. The film of claim 10 wherein said combination is biaxially oriented.

12. The film of claim 10 wherein said agent is a slip agent.

13. The film of claim 12 wherein said slip agent is an amide of a fatty acid.

14. The film of claim 13 wherein said amide is selected from the group consisting of erucamide, oleamide, stearamide and mixtures thereof.

15. The film of claim 11 wherein said polypropylene of comparatively high stereoregularity has a $T_R$ of at least about 300° F.

16. The film of claim 15 wherein said polypropylene has $T_R$ of at least about 309° F.

17. The film of claim 11 wherein the skin layer thickness is a minor percentage of the overall film thickness.

18. The film of claim 17 wherein said minor percentage is from about 1.5 to 30% of the overall thickness.

19. The film of claim 11 having been conditioned by holding the same for a period of about 6 hours to about one week at a temperature of from about 85° to about 150° F.

20. The film of claim 19 having been held for a period of about 6 hours to about 72 hours at a temperature of from about 100° to about 140° F.

21. A multi-layer polypropylene film structure having a slip agent bloomed on the surface thereof comprising a coextruded biaxially oriented combination of:
 (a) a base layer comprising polypropylene, the precursor resin of which has a $T_R$ of at least about 300° F. and which contains a slip agent at least substantially uniformly dispersed therein; and
 (b) a skin layer comprising polypropylene having a $T_R$ of less than that of (a) on at least one surface of (a), the surface of (b) having bloomed thereon said slip agent in an effective quantity greater than that of said slip agent-containing precursor resin alone in extruded film form.

22. The film of claim 21 having been conditioned by holding the same for a period of about 6 hours to about one week at a temperature of from about 85° to about 150° F.

23. The film of claim 22 having been held for a period of about 6 hours to about 72 hours at a temperature of from about 100° to about 140° F.

24. The film of claim 21 wherein the precursor resin of (b) does not contain slip agent.

25. The film of claim 21 wherein the precursor resin of (b) does contain slip agent.

* * * * *